US009935815B2

(12) United States Patent
Asoline et al.

(10) Patent No.: US 9,935,815 B2
(45) Date of Patent: Apr. 3, 2018

(54) DATA ADMINISTRATION UNIT, DATA ACCESS UNIT, NETWORK ELEMENT, NETWORK, AND METHOD FOR UPDATING A DATA STRUCTURE

(75) Inventors: Klod Asoline, Beer Sheva (IL); Moti Dvir, Kiryat Ono (IL); Ilan Weiss, Lehavim (IL)

(73) Assignee: NXP USA, Inc., Austin, TX (US)

( * ) Notice: Subject to any disclaimer, the term of this patent is extended or adjusted under 35 U.S.C. 154(b) by 1215 days.

(21) Appl. No.: 13/382,779

(22) PCT Filed: Jul. 16, 2009

(86) PCT No.: PCT/IB2009/053099
§ 371 (c)(1),
(2), (4) Date: Jan. 6, 2012

(87) PCT Pub. No.: WO2011/007202
PCT Pub. Date: Jan. 20, 2011

(65) Prior Publication Data
US 2012/0117340 A1    May 10, 2012

(51) Int. Cl.
*G06F 12/00*   (2006.01)
*H04L 12/24*   (2006.01)

(52) U.S. Cl.
CPC .............. *H04L 41/00* (2013.01); *G06F 12/00* (2013.01)

(58) Field of Classification Search
CPC .................................. G06F 12/00; H04L 41/00
USPC .......................................................... 711/159
See application file for complete search history.

(56) References Cited

U.S. PATENT DOCUMENTS

| 6,396,845 | B1 * | 5/2002 | Sugita ........................... 370/449 |
| 2002/0041547 | A1 * | 4/2002 | Katayama et al. ........ 369/47.24 |
| 2005/0055570 | A1 * | 3/2005 | Kwan ..................... H04L 63/08 726/4 |
| 2005/0147111 | A1 | 7/2005 | Moleyar et al. |
| 2006/0146881 | A1 | 7/2006 | Basso et al. |

(Continued)

FOREIGN PATENT DOCUMENTS

FR    2720529 A1    12/1995

OTHER PUBLICATIONS

Toyn, Ian et al., "Efficient Binary Transfer of Pointer Structures," Software Practice and Experience, vol. 24, No. 11; Nov. 1, 2004; XP000655480; pp. 1001-1023.

(Continued)

*Primary Examiner* — Daniel C Chappell
*Assistant Examiner* — Gautam Sain (57) ABSTRACT

A data administration unit for updating a first data structure in a first memory may comprise a second memory, a data structure generator for setting up a second data structure in the second memory, a pointer generator for setting at least one of a dynamic change indicator and a pointer in the first data structure, a waiting unit for waiting for a finalization of a data access of a data access unit, and a data structure over-writer for overwriting the first data structure using data of the second data structure. An data access unit for accessing a first data structure in a first memory may comprise a data access driver, a first synchronization signal evaluator for reception and evaluation of a first synchronization signal, and a synchronization approval signal generator for generation and submission of a first synchronization signal.

18 Claims, 6 Drawing Sheets

(56) References Cited

U.S. PATENT DOCUMENTS

2006/0262791 A1 11/2006 Kadambi et al.
2007/0130441 A1 6/2007 Wooten
2007/0208935 A1* 9/2007 Choi et al. .................... 713/161
2008/0101381 A1* 5/2008 Sun ................... H04L 29/12028
 370/395.54
2008/0247398 A1 10/2008 Meyer et al.
2010/0262578 A1* 10/2010 Arimilli et al. ............... 707/609
2011/0173635 A1* 7/2011 Berg ............................ 719/312

OTHER PUBLICATIONS

International Search Report and Written Opinion correlating to PCT/IB2009/053099 dated Apr. 9, 2010.

\* cited by examiner

DATA ADMINISTRATION UNIT, DATA ACCESS UNIT, NETWORK ELEMENT, NETWORK, AND METHOD FOR UPDATING A DATA STRUCTURE

FIELD OF THE INVENTION

This invention relates to a data administration unit. Further, this invention relates to a data access unit. This invention also relates to a network element and also to a network. Apart from this, the invention relates to a method for updating a data structure.

BACKGROUND OF THE INVENTION

For transmission of a data packet in a local area network (LAN), the data packet may be packed into a frame. A MAC address (MAC=Media Access Control) of a target computer may be entered into said frame. On the basis of the MAC address valid in the local network the data packet may be sent to the target computer. Using a protocol as ARP (Address Resolution Protocol), the MAC address valid in the local network corresponding to an IP address of the target computer may be requested by a network element which forwards the data packet. Assignments of the MAC address to an IP address of the target computer, or vice versa, may be stored in an address table. Then, assignments do not have to be determined for each data packet to be sent to a specific target computer of the LAN. The address assignments in this address table may be provided with a timer value limiting a period of validity of the address assignment. After time-out an address assignment may be deleted from the address table.

SUMMARY OF THE INVENTION

The present invention provides a data administration unit, a data unit, a network element, and a method for updating a data structure as described in the accompanying claims. Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION

Figure 1:
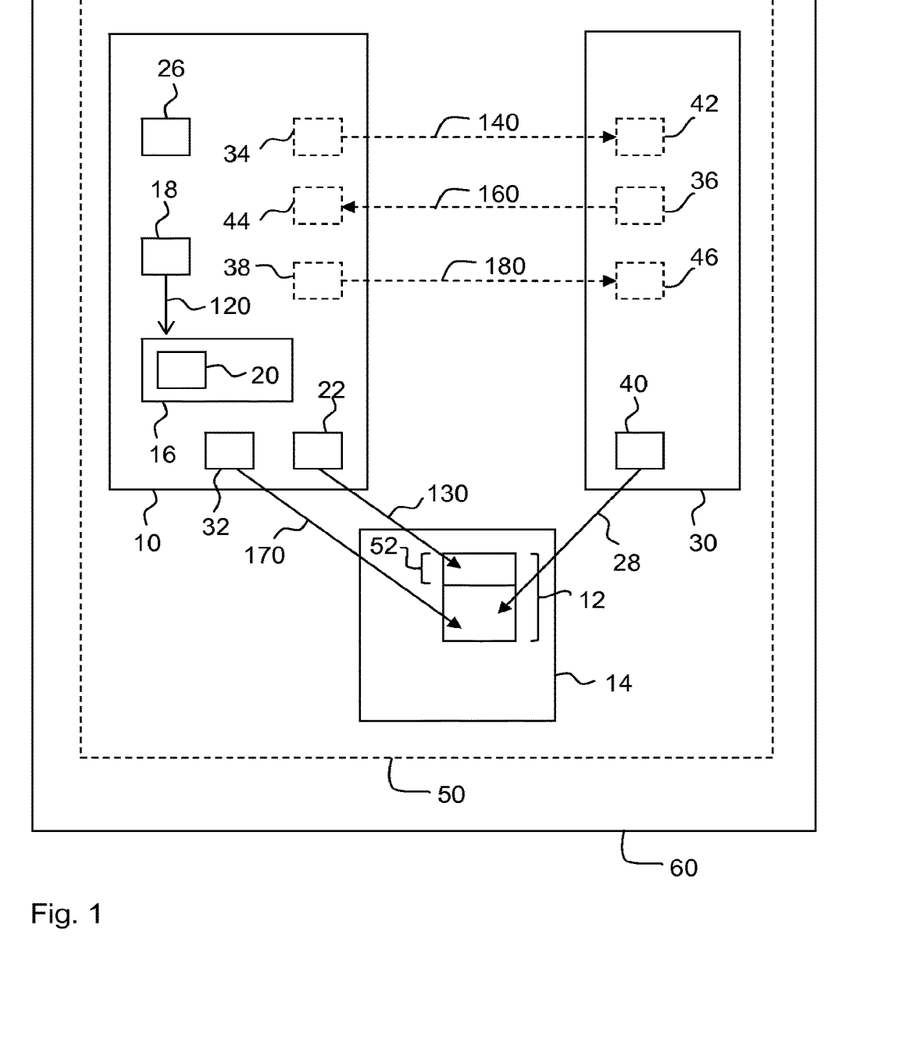
FIG. 1 shows schematically an arrangement of an administration unit, a memory, a data access unit, a network element, and a network.

FIG. 1 shows schematically an arrangement of an example network 60 having an example network element 50. The network element 50 may comprise an example data access unit 30. The network 60 may be a data or a communication network. The network 60 may have many network elements of same or other type as well as many links for connecting the network elements (FIG. 1 illustrates only one element 50 of the network 60). The network element 50 may be a bridge or a router of the network 60. The network 60 may comprise an example data administration unit 10.

The data administration unit 10 for updating a first data structure 12 in a first memory 14 may comprise: a second memory 16, a data structure generator 18 for setting up a second data structure 20 in the second memory 16, a pointer generator 22 for setting at least one of a dynamic change indicator DCI and a pointer P in the first data structure 12, a waiting unit 26 for waiting for a finalization of a data access, as indicated with the arrow 28, of a data access unit 30, and a data structure over-writer 32 for overwriting the first data structure 12 using data of the second data structure 20. The pointer generator 22 may set the dynamic change indicator DCI respectively pointer P in a begin 52 of the first data structure 12. The dynamic change indicator DCI may be defined as a part of the pointer P. Or the pointer P may be considered as a part of the dynamic change indicator DCI. The pointer P may point to the second data structure 20. The data administration unit 10 may comprise a first synchronization signal generator 34 for generation and submission 140 of a first synchronization signal to the data access unit 30. The data administration unit 10 may comprise a synchronization approval signal receiver 44 for reception 160 of a synchronization approval signal from the data access unit 30. The data administration unit 10 may comprise a second synchronization generator 38 for generation and submission 180 of a second synchronization signal to the data access unit 30.

The data access unit 30 for accessing 28 the first data structure 12 in the first memory 14 may comprise: a data access driver 40, a first synchronization signal evaluator 42 for reception 140 and evaluation of the first synchronization signal, and a synchronization approval signal generator 36 for generation and submission 160 of the synchronization approval signal. The data access unit 30 may comprise a second synchronization signal evaluator 46 for reception 180 and evaluation of the second synchronization signal. The data access unit 30 may comprise a marker for tagging data packets allocated last.

FIGS. 2 to 10 show schematically an example updating sequence of an example data structure 12. The data structure 12 comprises k information units $AD_{1p}, AD_{2p} \ldots AD_{ip} \ldots AD_{kp}$. The second index "p" may stand for "previous". Each of the units $AD_{1p} \ldots AD_{kp}$ may have a same number of bytes. Each of the information units $AD_{1p} \ldots AD_{kp}$ may comprise an action descriptor describing an action performed or an action to be performed. $AD_{1p}$ may represent a first of the information units. The action descriptor may be a Coarse Classification Action Descriptor used in a network element 50 of a communication network 60. $AD_{2p}$ may represent a second of the information units $AD_{1p} \ldots AD_{kp}$. $AD_{kp}$ may represent a last of the information units. $AD_{ip}$ may represent one of the units between the second $AD_{2p}$ and the last $AD_{kp}$ of the information units. In the figures, the updating of the data structure 12 is illustrated with example data structures 12 and 20 each having four information units $AD_{1p} \ldots AD_{kp}$ and $AD_{1n} \ldots AD_{kn}$, respectively. The second index "n" may stand for "new". Each information unit $AD_{1p} \ldots AD_{kp}$, respectively $AD_{1n} \ldots AD_{kn}$ may comprise at least or exactly eight Bytes.

Figure 2:
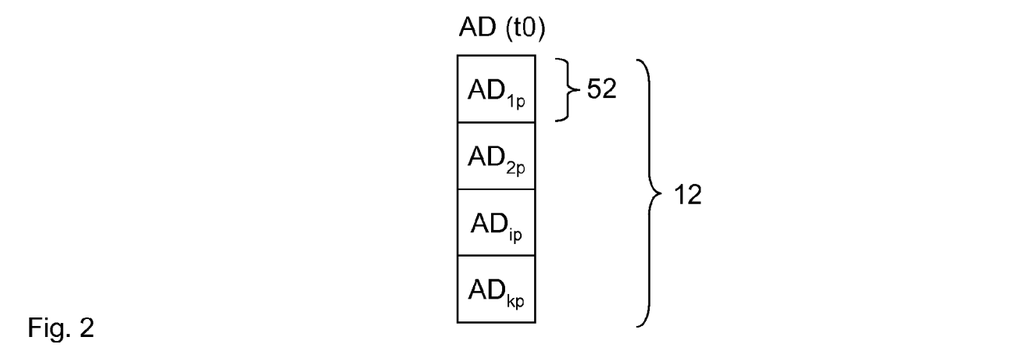
FIG. 2 shows schematically a state of a first data structure at a first instant.

FIG. 2 shows schematically a state of a first example data structure 12 at a first instant t0.

Figure 3:
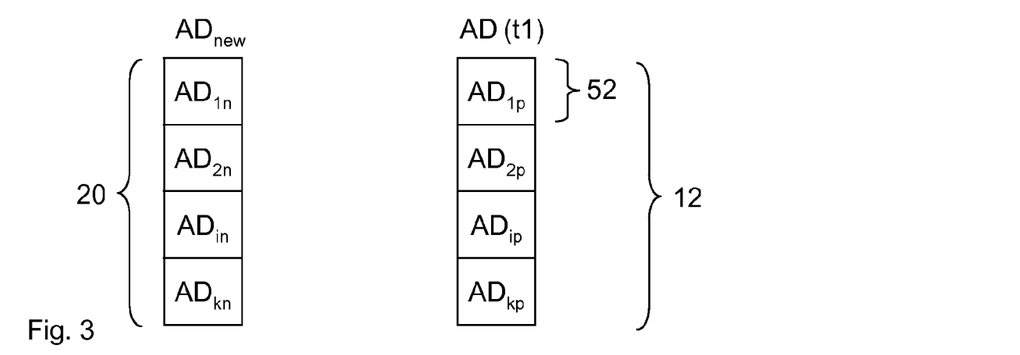
FIGS. 3 to 10 show schematically states of the first and of a second data structure during subsequent updates.

FIG. 3 shows schematically a state of the first example data structure 12 and a state of a second example data structure 20 at a second instant t1. The second data structure 20 may be created by a data structure generator 18 of the data administration unit 10. The second data structure 20 may represent new data $AD_{1n} \ldots AD_{kn}$ for substituting previous data $AD_{1p} \ldots AD_{kp}$ of the first data structure 12.

Figure 4:
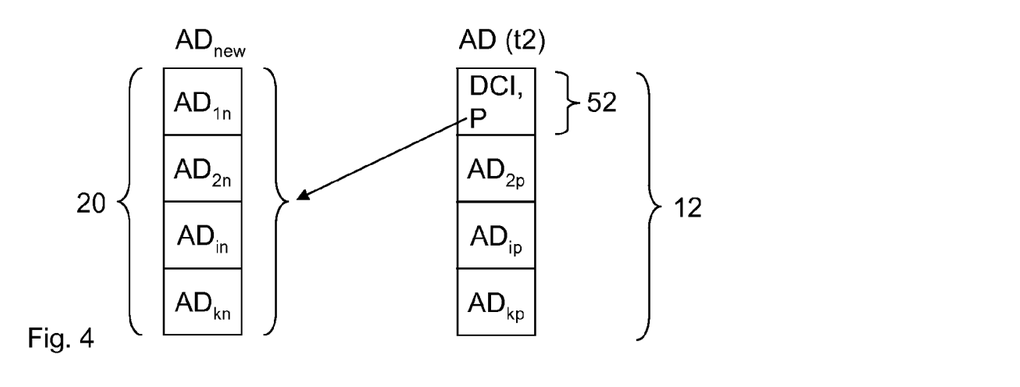

FIG. 4 shows schematically a state of the first example data structure 12 and a state of a second example data structure 20 at a third instant t2. During a period between the states of FIG. 3 and FIG. 4, the first information unit $AD_{1p}$ may be substituted by at least one of a dynamic change indicator DCI and a pointer P pointing to the second data structure 20. The dynamic change indicator DCI, respectively pointer P, may be generated by a pointer generator 22 of the data administration unit 10.

Figure 5:
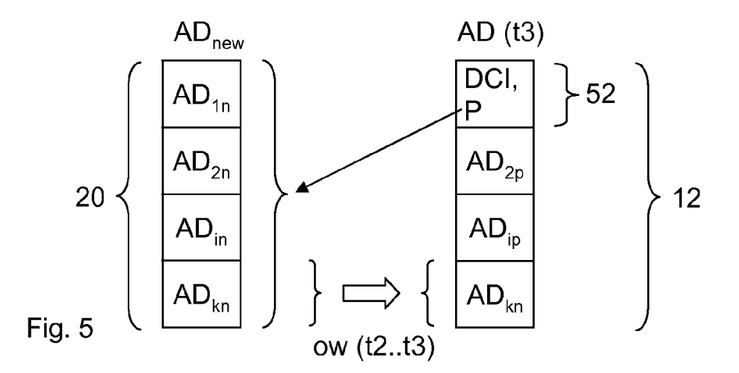

FIG. 5 shows schematically a state of the first example data structure 12 and a state of a second example data structure 20 at a fourth instant t3. During a period between the states of FIG. 4 and FIG. 5, the last information unit $AD_{kp}$ may be substituted by the information unit $AD_{kn}$ (overwriting ow(t2 . . . t3)). A step-by-step substitution of the information units $AD_{2p} \ldots AD_{kp}$ of the first data structure 12 by corresponding information units $AD_{2n} \ldots AD_{kn}$ of the second data structure 20 may be performed by a data-structure over-writer 32 of the data administration unit 10.

Figure 6:
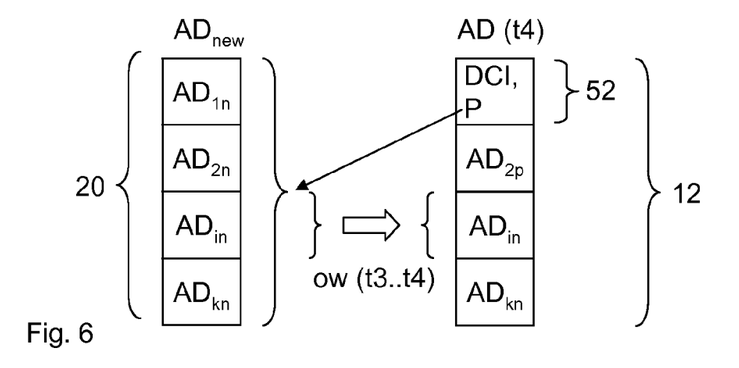

FIG. 6 shows schematically a state of the first example data structure 12 and a state of a second example data structure 20 at a fifth instant t4. During a period between the states of FIG. 5 and FIG. 6, the information unit $AD_{ip}$ may be substituted by the information unit $AD_{in}$ (overwriting ow(t3 . . . t4)). Corresponding applies when there are more than one information unit $AD_{ip}$ between $AD_{2p}$ and $AD_{kp}$.

Figure 7:
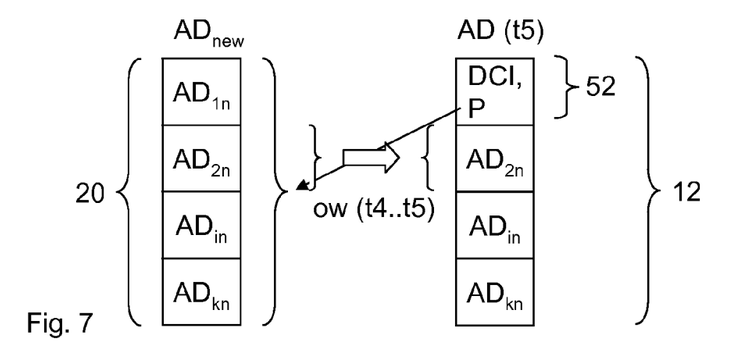

FIG. 7 shows schematically a state of the first example data structure 12 and a state of a second example data structure 20 at a sixth instant t5. During a period between the states of FIG. 6 and FIG. 7, the second information unit $AD_{2p}$ may be substituted by the second information unit $AD_{2n}$ of the second data structure 20 (overwriting ow(t4 . . . t5)).

Figure 8:
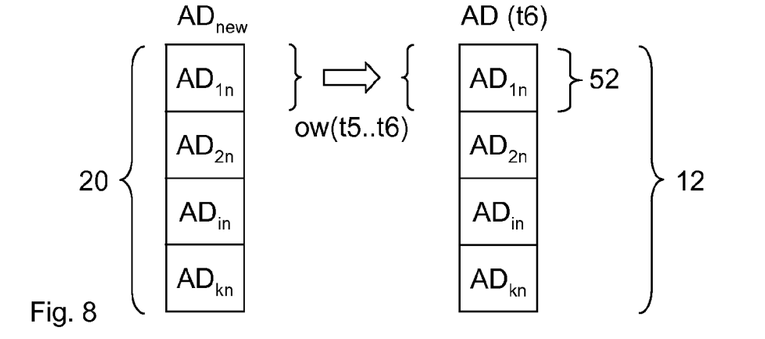

FIG. 8 shows schematically a state of the first example data structure 12 and a state of a second example data structure 20 at a seventh instant t6. During a period between the states of FIG. 7 and FIG. 8, the first information unit $AD_{1p}$ or dynamic change indicator DCI, respectively pointer P, may be substituted by the first information unit $AD_{1n}$ of the second data structure 20 (overwriting ow(t5 . . . t6)). The substitution of the first information unit $AD_{1p}$, respectively dynamic change indicator DCI, respectively pointer P, may be performed by the data-structure over-writer 32 of the data administration unit 10. With this action a substitution of the first data structure 12 by the second data structure 20 may be completed.

Figure 9:
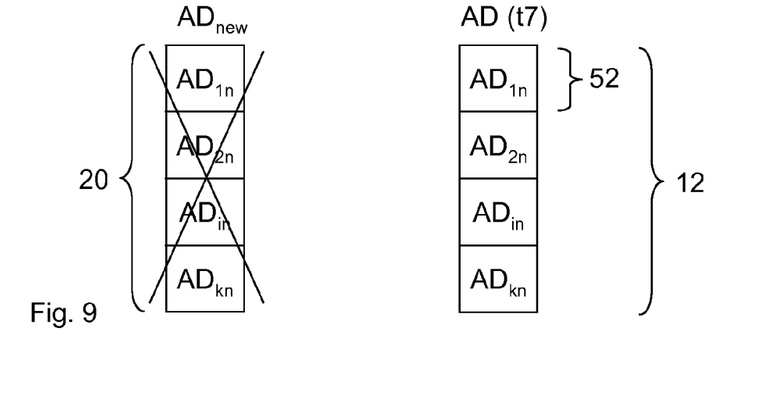

FIG. 9 shows schematically a state of the first example data structure 12 and a state of a second example data structure 20 at a eighth instant t7. Therein, the second data structure 20 is being deleted from the second memory 16.

Figure 10:
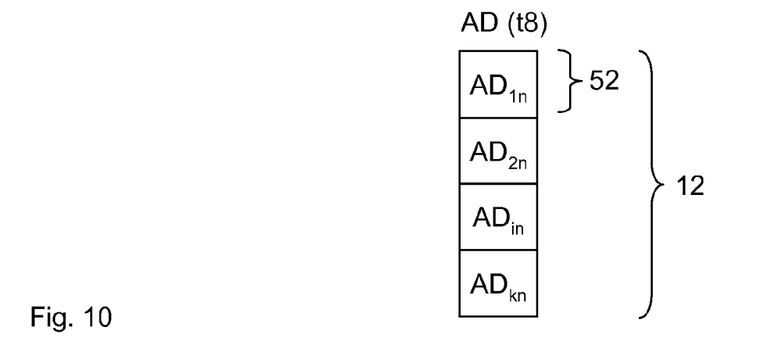

FIG. 10 shows schematically a state of the first example data structure 12 at a ninth instant t8. Therein, a status may occur, wherein the second data structure 20 is no longer existent. Such status is illustrated in the figure by not showing any state of a second data structure 20.

Figure 11:
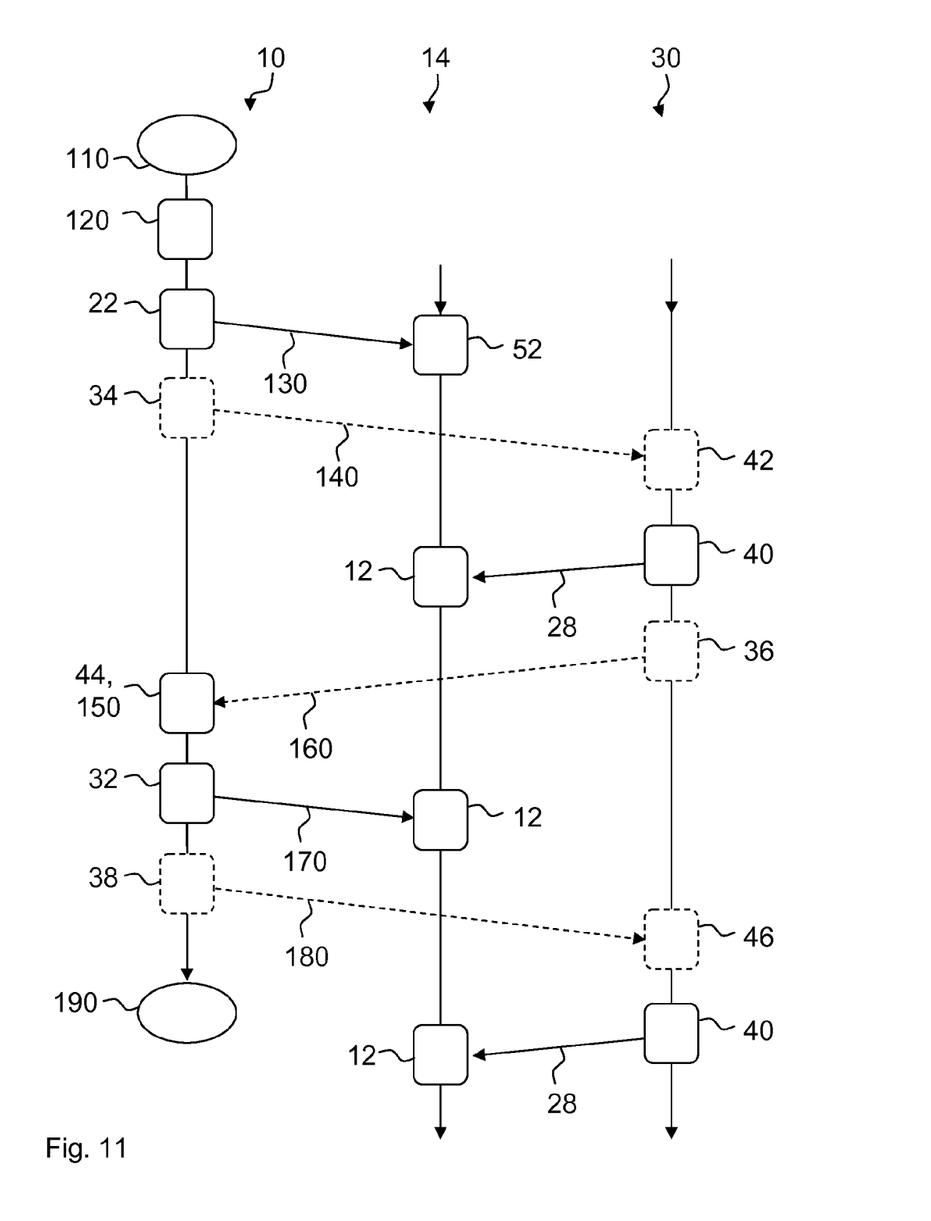
FIG. 11 shows schematically a message exchange diagram of messages between a data administration unit, a memory, and a data access unit.

FIG. 11 shows schematically a message exchange diagram of an update method 100 for a data structure 12. Method 100 for updating a first data structure 12 in a first memory 14 may comprise: setting up a second data structure 20 in a second memory 16 (step 120), setting at least one of a dynamic change indicator DCI and a pointer P in a begin 52 of a first data structure 12 (step 130), waiting for a finalization of a running data access 28 of a data access unit 30 on the first data structure 12 in the first memory 14 (step 150), and overwriting the first data structure 12 in the first memory 14 by the data administration unit 10 using data of the second data structure 20 (step 170).

When the data access unit 30 starts accessing 28 a data packet after reception 140 of the first synchronization signal, the data access unit 30 may evaluate the first data structure 12 starting with a begin 52 of the first data structure 12 and may recognize in the first data structure 12 the dynamic change indicator DCI, respectively pointer P. Then, the data access unit 30 may continue the evaluation using the second data structure 20 stored in the second memory 16. This scheme assures that newly-allocated data packets are processed using an updated and complete consistent set of information units $AD_{2n} \ldots AD_{kn}$ of the second data structure 20.

When there is a mechanism preventing simultaneous updates of the first data structure 12, an address of the second data structure may be fixed or predetermined and known to the data access unit 30. When a pointer P is provided, the pointer P may indicate an address of memory 16, where the data access unit 30 may find the new data structure 20 corresponding to the previous data structure 12.

After reception 140 of a first synchronization signal, the data access unit 30 may tag a most-recently allocated data packet and continue accessing the tagged data packet using the remainder of the current (i.e. previous) content of the first data structure 12. This scheme assures that such portions of the data structure 12 are not changed in the middle of processing of a data packet, which is still relevant for processing the data packet. In other words, this scheme assures that during the transition period there will be no affect on the processing of such data packets on which processing has started before reception 140 of the first synchronization signal.

After finalization of the data access 28 for all tagged data packets, the data access unit 30 may submit a synchronization approval signal 160 to the data administration unit 10. After reception of the synchronization approval signal 160 by the synchronization approval signal receiver 44, the data administration unit 10 may modify all remaining parts of the first data structure 12. The first information unit at the begin 52 of the first data structure 12 may be overwritten at last. This may be achieved by overwriting the remaining parts of the first data structure 12 in reverse order.

After overwriting the whole first data structure 12, the data administration unit 10 may send a second synchronization signal to the data access unit 30 (step 180). The second synchronization signal may assure that the data access unit 30 uses the first data structure 10 filled by the new information units $AD_{2n} \ldots AD_{kn}$. After completion of transmission of the second synchronization signal to the data access unit 30, the data administration unit 10 may de-allocate the second data structure 20 (compare FIGS. 9 and 10).

Figure 12:
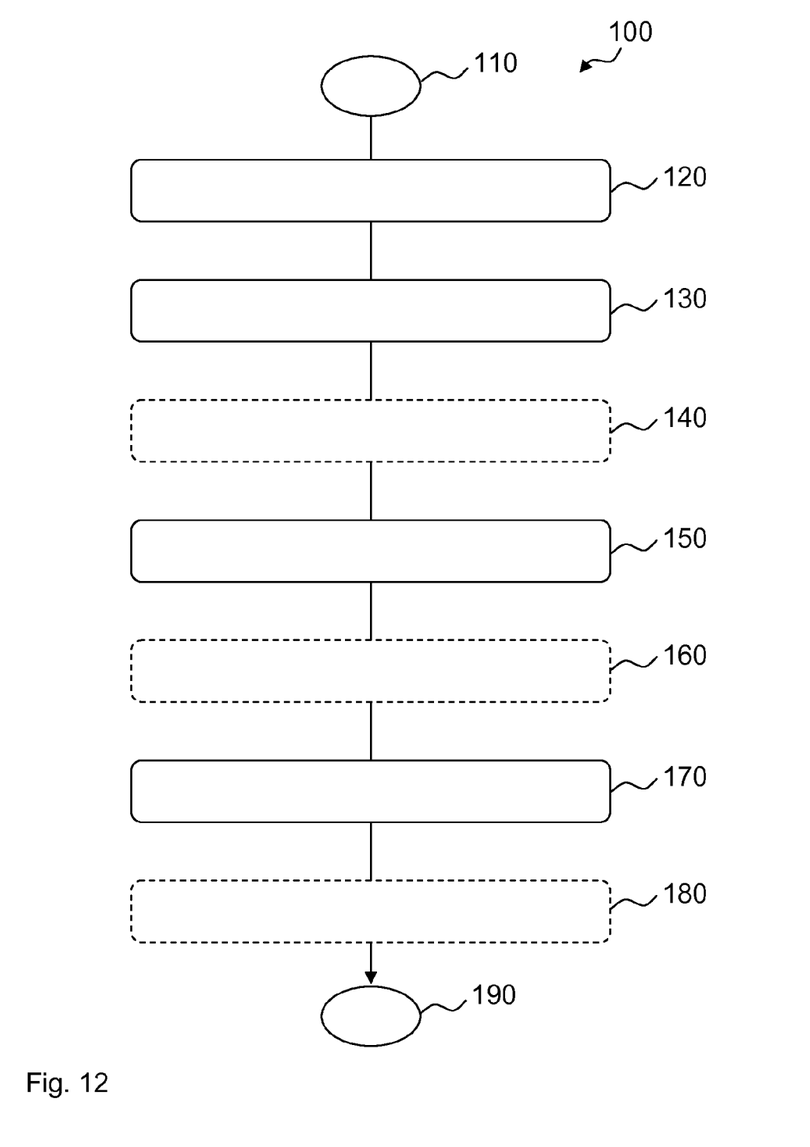
FIG. 12 shows schematically a flow diagram of an update method for a data structure.

FIG. 12 shows schematically a flow diagram of a method 100 for updating a first data structure 12 in a first memory 14. After start 110 of the procedure, the method 100 may comprise steps of: setting up a second data structure 20 in a second memory 16 (step 120), and setting at least one of a dynamic change indicator DCI and a pointer P in a first data structure 12 (step 130). The pointer P may point to the second data structure 20. After reception of the first synchronization signal from the data administration unit 10 (step 140), the data access unit 30 may tag an allocated data packet. The data access unit 30 may evaluate the first data structure 12 starting with a begin 52 of the first data structure 12. When the data access driver 40 has recognized in the first data structure 12 at least one of a dynamic change indicator DCI and a pointer P, the data access unit 30 may continue the evaluation with the second data structure 20 stored in the second memory 16. After setting the dynamic change indicator DCI, respectively pointer P, the data administration unit 10 may submit a first synchronization signal to the data access unit 30 (step 140). Then, the data administration unit may wait for a finalization of a data access 28 of the data access unit 30 on the first data structure 12 (step 150). After finalization of the data access 28 to the allocated data packet, the data access unit 30 may submit a synchronization approval signal to the data administration unit 10 (step 160). The data administration unit 10 may receive the synchronization approval signal (step 160). Then, the data administration unit 10 may complete over-writing the first data structure 12 in the first memory 14 using data of the second data structure 20 (step 170). The data administration unit 10 may send a second synchronization signal to the data access unit 30 (step 180). It may be also possible that a first synchronization signal is generated by the data access unit 30 itself, when the data access unit 30 detects at least one of a dynamic change indicator DCI and a pointer P in the begin 52 of the first data structure 12.

Conventionally, when a corresponding address assignment has been deleted from the address table and a further data packet is to be sent to a target computer, the assignment between the IP address of the target computer and the MAC address may have to be determined once again and stored once more in the address table. A transmission of data packets may be resumed after the new address assignment has been entered into the address table. During determination of the address assignment, it may happen that no data packets can be sent to the target computer. During such a situation, incoming data packets may be stored in a buffer belonging to layer two of the OSI reference model (OSI=Open Systems Interconnection). Problems which may then occur are that delivery of buffered data packets may be delayed. Even data packets may get lost, when the buffer is fully occupied and does not accept any further data packets, which then have to be discarded. In such situation, a quality of service of the LAN may no longer be maintained.

Employing the described data administration unit 10, data access unit 30, network element 50, network 60, and method 100 for updating a data structure, it is not necessary to stop the data packet receiver for updating the first data structure 12. The first data structure 12 may be an address conversion table of a network element 50, of a bridge, or of a router. Neither it is necessary to invalidate a table entry to be changed such that received data packets are discarded. The proposed updating scheme facilitates an updating of tables without performance degradation or data packet loss and without a risk of partial updates causing errors. Neither any buffers are needed for avoiding loss of data packets. These features may help avoiding latency, which may be caused otherwise by use of buffering of data packets during address table updates. Using the described devices 10, 30, 50, 60, and updating method 100 may result in that only new data packets are affected. This may avoid a need to stop processing data packets and may maintain performance. The devices may be realized partially by hardware and partially by micro-code. A processing of the synchronization signals may increase an efficiency of the proposed updating scheme.

The data administration unit 10 may proceed more slowly from information unit to information unit than the data access unit 30 can proceed from information unit to information unit. At least under this assumption, there was no danger that the data administration unit 10 overtakes the data access unit 30, and all synchronization signals or a subset of them may be omitted, while achieving at least similar benefits. For illustrating this, the corresponding actions are shown with dashed lines. Such omission of all synchronization signals or of a subset thereof may require that the data administration unit 10 proceeds from information unit to information unit not in reverse order but in same order as the data access unit 30 proceeds from information unit to information unit.

In FIG. 1 the second memory 16 is shown as a part of the data administration unit 10. Nevertheless, the second memory 16 may be realized as a unit separate to the data administration unit 10.

The proposed updating scheme may suppose that both or at least one of the information units of the first data structure 12 may be write-accessible by the data administration unit 10, only when the data access unit 30 does not access the same information unit at a same instant.

In the foregoing specification, the invention has been described with reference to specific examples of embodiments of the invention. It will, however, be evident that while the principles of the invention have been described above in connection with specific apparatus, it is to be clearly understood that this description is made only by way of example and not as a limitation on the scope of the invention and that various modifications and changes may be made therein without departing from the broader spirit and scope of the invention as set forth in the appended claims.

For example, each of the devices described, as well as each of the devices claimed, may be realized with a single-die IC, as well with a multi-die IC. Furthermore, the connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time-multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality. Furthermore, those skilled in the art will recognize that the functionality of multiple operations may be combined into a single operation, and/or the functionality of a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A network element comprising:
   a first memory;
   a second memory;
   a data administration circuit to update a first data structure stored at the first memory by over-writing, the data administration circuit comprising:
      a data structure generator configured to set up a second data structure in the second memory,
      a pointer generator configured to set at least one of a dynamic change indicator and a pointer in the first data structure, wherein the pointer points to the second data structure,
      a waiting unit configured to wait for a finalization of a data access of a data access circuit,
      a first synchronization signal generator configured to generate and submit a first synchronization signal to the data access circuit,
      a synchronization approval signal receiver configured to receive a synchronization approval signal from the data access circuit, and
      a data structure over-writer configured to overwrite the first data structure using data of the second data structure; and
   the data access circuit, distinct from the data administration circuit, to access the first data structure, the data access circuit comprising:
      a first synchronization signal evaluator configured to receive and evaluate the first synchronization signal, and
      a synchronization approval signal generator configured to generate and submit the synchronization approval signal, the synchronization approval signal providing a temporal synchronization between an overwrite of the first data structure performed by the data administration circuit and an access of the first data structure performed by the data access circuit.

2. The network element according to claim 1, wherein the data access circuit comprises a data access driver.

3. The network element according to claim 1, the data administration circuit further comprising a second synchronization signal generator configured to generate and submit a second synchronization signal to the data access circuit.

4. The network element according to claim 1, the data access circuit further comprising a second synchronization signal evaluator configured to receive and evaluate a second synchronization signal.

5. The network element according to claim 1, wherein the data access circuit comprises a marker for tagging data packets allocated last.

6. The network element according to claim 1, wherein the data access circuit is configured to access a data packet after receiving the first synchronization signal.

7. The network element according to claim 1, wherein the pointer generator sets both the dynamic change indicator and the pointer in the first data structure and the data structure over-writer overwrites the dynamic change indicator and the pointer with data of the second data structure.

8. A method for updating a first data structure in a first memory of a network element by over-writing, the method comprising:
   setting up a second data structure in a second memory of the network element with a data administration circuit of the network element;
   setting a pointer in the first data structure, wherein the pointer points to the second data structure;
   generating a first synchronization signal by the data administration circuit;
   receiving the first synchronization signal at a data access circuit of the network element;
   waiting for a finalization of a data access of the data access circuit on the first data structure in the first memory;
   generating a synchronization approval signal by the data access circuit;
   submitting the synchronization approval signal to the data administration circuit after finalization of the data access, the synchronization approval signal indicative of a temporal synchronization between the data access by the data access circuit and an over-writing of the first data structure by the data administration circuit; and
   over-writing the first data structure in the first memory by the data administration circuit using data of the second data structure.

9. The method according to claim 8, wherein the data access circuit evaluates the first data structure starting with a begin of the first data structure.

10. The method according to claim 9, wherein the data access circuit continues the evaluation with the second data structure stored in the second memory, when the data access driver has recognized the pointer in the first data structure.

11. The method according to claim 8, wherein the data access circuit, after reception of the first synchronization signal, tags a data packet allocated last.

12. The method according to claim 8, further comprising transmitting the first synchronization signal from the data administration circuit to the data access circuit prior to submission of the synchronization approval signal to the data administration circuit.

13. The method according to claim 12 further comprising transmitting a second synchronization signal from the data administration circuit to the data access circuit subsequent to submission of the synchronization approval signal to the data administration circuit.

14. A network element comprising:
a first memory;
a second memory;
a data administration circuit configured to update a first data structure stored at the first memory by overwriting, the data administration circuit comprising:
   a data structure generator configured to set up a second data structure in the second memory,
   a pointer generator configured to set a pointer in the first data structure, wherein the pointer points to the second data structure,
   a waiting unit configured to wait for a finalization of a data access of a data access circuit,
   a first synchronization signal generator configured to generate and submit a first synchronization signal to the data access circuit,
   a synchronization approval signal receiver configured to receive a synchronization approval signal from the data access circuit, the synchronization approval signal providing a temporal synchronization between an overwrite of the first data structure performed by the data administration circuit and an access of the first data structure performed by the data access circuit, and
   a data structure over-writer configured to overwrite the first data structure using data of the second data structure; and
the data access circuit, distinct from the data administration circuit, configured to access the first data structure.

15. The network element according to claim 14, wherein the data access circuit comprises:
   a data access driver,
   a first synchronization signal evaluator configured to receive and evaluate the first synchronization signal, and
   a synchronization approval signal generator configured to generate and submit the synchronization approval signal.

16. The network element according to claim 14, the data administration circuit further comprising a second synchronization signal generator configured to generate and submit a second synchronization signal to the data access circuit.

17. The network element according to claim 14, the data access circuit further comprising a second synchronization signal evaluator configured to receive and evaluate a second synchronization signal.

18. The network element according to claim 14, wherein the data access circuit comprises a marker for tagging data packets allocated last.

* * * * *